(12) United States Patent
Kobayashi

(10) Patent No.: US 10,890,698 B2
(45) Date of Patent: Jan. 12, 2021

(54) DIFFRACTION OPTICAL ELEMENT, OPTICAL SYSTEM, AND IMAGING APPARATUS

(71) Applicant: CANON KABUSHIKI KAISHA, Tokyo (JP)

(72) Inventor: Mikio Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 16/154,789

(22) Filed: Oct. 9, 2018

(65) Prior Publication Data

US 2019/0113663 A1  Apr. 18, 2019

(30) Foreign Application Priority Data

Oct. 12, 2017  (JP) .................................. 2017-198312

(51) Int. Cl.
*G02B 5/18* (2006.01)

(52) U.S. Cl.
CPC .......... *G02B 5/1871* (2013.01); *G02B 5/1823* (2013.01)

(58) Field of Classification Search
CPC ............ G02B 27/0018; G02B 27/4205; G02B 27/4272; G02B 5/1823; G02B 5/1871; G02B 5/18
See application file for complete search history.

(56) References Cited

U.S. PATENT DOCUMENTS

| 6,650,477 | B2 * | 11/2003 | Nakai | G02B 5/1866 |
| | | | | 359/565 |
| 7,042,642 | B2 * | 5/2006 | Tokoyoda | G02B 5/1814 |
| | | | | 359/566 |
| 2005/0226122 | A1 * | 10/2005 | Ooi | G11B 7/1353 |
| | | | | 369/112.05 |
| 2008/0088950 | A1 * | 4/2008 | Endo | G02B 13/02 |
| | | | | 359/785 |
| 2009/0027776 | A1 * | 1/2009 | Schall | G02B 5/285 |
| | | | | 359/571 |
| 2009/0141354 | A1 * | 6/2009 | Kobayashi | G02B 5/1852 |
| | | | | 359/571 |
| 2011/0261459 | A1 * | 10/2011 | Minami | G02B 5/1866 |
| | | | | 359/576 |
| 2011/0304916 | A1 * | 12/2011 | Ushigome | G02B 5/1814 |
| | | | | 359/576 |
| 2012/0062847 | A1 * | 3/2012 | Yamaguchi | G02B 5/1871 |
| | | | | 353/20 |
| 2012/0120494 | A1 * | 5/2012 | Takayama | G02B 27/4272 |
| | | | | 359/576 |
| 2012/0300301 | A1 * | 11/2012 | Ando | G02B 27/4211 |
| | | | | 359/565 |

(Continued)

FOREIGN PATENT DOCUMENTS

JP  2014170109 A  9/2014
WO  2011099550 A1  8/2011

*Primary Examiner* — Balram T Parbadia
(74) *Attorney, Agent, or Firm* — Carter, DeLuca & Farrell LLP

(57) ABSTRACT

A diffraction optical element includes a first diffraction grating having a first grating surface and a first grating wall surface, a second diffraction grating having a second grating surface and a second grating wall surface, and a thin film configured to contact the first grating wall surface and the second grating wall surface. The predetermined conditions are satisfied.

13 Claims, 9 Drawing Sheets

(56) References Cited

U.S. PATENT DOCUMENTS

| | | | | |
|---|---|---|---|---|
| 2013/0155514 A1* | 6/2013 | Ushigome | ............... | G02B 5/18 |
| | | | | 359/571 |
| 2013/0194487 A1* | 8/2013 | Eguchi | ............... | G02B 27/4211 |
| | | | | 348/360 |
| 2014/0247492 A1* | 9/2014 | Ushigome | ............ | G02B 5/1866 |
| | | | | 359/569 |

* cited by examiner

DIFFRACTION OPTICAL ELEMENT, OPTICAL SYSTEM, AND IMAGING APPARATUS

BACKGROUND OF THE INVENTION

Field of the Invention

The present invention relates to a diffraction optical element suitable for an optical system.

Description of the Related Art

Japanese Patent Laid-Open No. 2014-170109 discloses a diffraction optical element that includes a material layer different from a grating or lattice material on a wall surface part of a diffraction grating, and reduces unnecessary light caused by an obliquely incident light beam different from a designed incident light beam. PCT Domestic Publication No. WO 2011/099550 discloses a diffraction optical element that improves the diffraction efficiency through a material layer different from the grating material on the wall surface part of the diffraction grating.

However, Japanese Patent Laid-Open No. 2014-170109 and Domestic Publication No. WO 2011/099550 are silent about appropriate setting of a film characteristic of the wall surface part according to a position in a radial direction of the diffraction optical element. Thus, the optical performance of the diffraction optical element cannot be improved.

SUMMARY OF THE INVENTION

The present invention provides a diffraction optical element, an optical system, and an imaging apparatus, each of which can improve an optical performance by appropriately setting a film characteristic according to a position in a radial direction.

A diffraction optical element according to one aspect of the present invention includes a first diffraction grating having a first grating surface and a first grating wall surface, a second diffraction grating having a second grating surface and a second grating wall surface, and a thin film configured to contact the first grating wall surface and the second grating wall surface. The following conditional expressions are satisfied:

$$n2 < n1 < nha$$

$$-0.500 < Pe/Pmax < 0.700$$

where $n1$ and $n2$ are refractive indexes for a designed wavelength of the first diffraction grating and the second diffraction grating, $nha$ is a refractive index for the designed wavelength of the thin film in an effective diameter, $Pmax$ is a maximum value of a phase difference for the designed wavelength between the thin film and the first diffraction grating of all annular bands, and $Pe$ is a phase difference for the designed wavelength between the thin film and the first diffraction grating at the effective diameter.

Further features of the present invention will become apparent from the following description of exemplary embodiments with reference to the attached drawings.

DESCRIPTION OF THE EMBODIMENTS

Referring now to the accompanying drawings, a detailed description will be given of examples according to the present invention.

Example 1

Figures 1A, 1B:
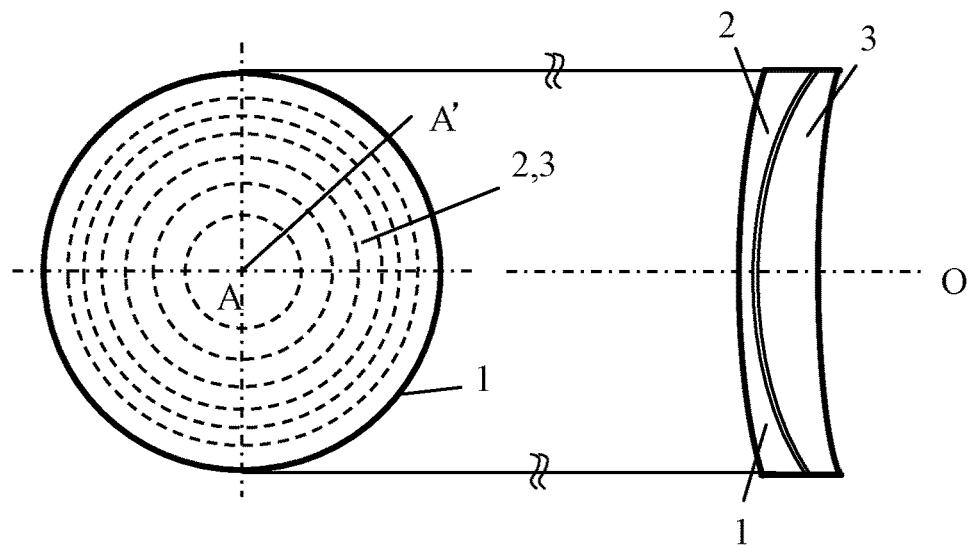
FIGS. 1A and 1B are front and side views of a diffraction optical element according to Example 1.
Figure 2:
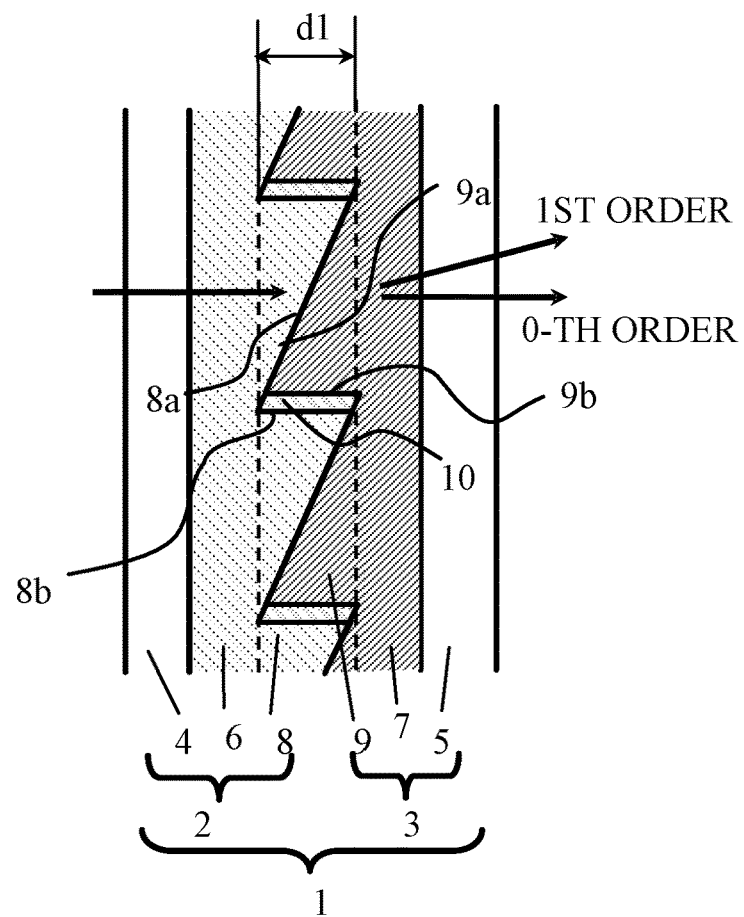
FIG. 2 is a partially sectional view of the diffraction optical element according to Example 1.

Referring now to FIGS. 1A, 1B, and 2, a description will be given of a configuration of a diffraction optical element according to Example 1 of the present invention. FIG. 1A is a front view of a diffraction optical element 1 according to this example, and FIG. 1B is a side view of the diffraction optical element 1. FIG. 2 is a partially enlarged sectional view of the diffraction optical element 1 taken along a line A-A' in FIG. 1A. FIG. 2 is a deformed figure in the grating depth direction.

As illustrated in FIGS. 1A, 1B, and 2, the diffraction optical element 1 includes a first element part 2 and a second element part 3. A first diffraction grating 8 and a second diffraction grating 9 are adhered to and laminated on each other via a dielectric thin film 10. As illustrated in FIG. 2, the first element part 2 includes a first transparent substrate 4, a first grating base part 6, and the first diffraction grating 8. The first diffraction grating 8 is integrated with the first grating base part 6, and the first grating base part 6 and the first diffraction grating 8 constitute a first grating forming layer. The second element part 3 includes a second transparent substrate 5, a second grating base part 7, and the second diffraction grating 9. The second diffraction grating 9 is integrated with the second grating base part 7, and the second grating base part 7 and the second diffraction grating 9 constitute a second grating forming layer. The first diffraction grating 8 and the second diffraction grating 9 are stacked on each other while a grating slope (first grating surface) 8a on the first diffraction grating 8 and a grating slope (second grating surface) 9a on the second diffraction grating 9 are adhered to each other. The dielectric thin film (thin film) 10 is provided between a grating wall surface (first grating wall surface) 8b on the first diffraction grating 8 and a grating wall surface (second grating wall surface) 9b on the diffraction grating 9. The dielectric thin film 10 contact both the grating wall surface 8b and the grating wall surface 9b.

The first element part 2 and the second element part 3 wholly serve as one diffraction optical element 1. The first diffraction grating 8 and the second diffraction grating 9 have a concentric grating shape around the optical axis O as a center, and provide a lens action by changing a grating pitch in a radial direction. In this example, a wavelength region of light entering the diffraction optical element 1 or a used wavelength region is a visible region, the materials and grating thicknesses of the first diffraction grating 8 and the second diffraction grating 9 are selected so as to make higher the diffraction efficiency of the first order diffracted light in the entire visible region.

Next follows a description of a specific configuration of the diffraction optical element 1. In the diffraction optical element 1 illustrated in FIG. 2, a first material of the first diffraction grating 8 uses a resin made by mixing $ZrO_2$ fine particles in acrylic resin and has Nd=1.619, N55=1.6216, vd=44.3, and θgF=0.569. A second material of the second diffraction grating 9 uses a resin made by mixing ITO fine particles in acrylic resin and has Nd=1.565, N55=1.5718, vd=19.2, and θgF=0.425.

The dielectric thin film 10 on the grating wall surface part uses a thin film made of a mixture material of $Al_2O_3$ and $ZrO_2$ and a thickness on the grating wall surface (thickness of the dielectric thin film 10) varies according to a position in the radial direction of the diffraction optical element 1. The refractive index changes according to the position in the radial direction of the diffraction optical element 1. In each example, the Abbe number vd and the partial dispersion ratio θgF are defined as the general definitions. In other words, where Ng, NF, Nd, and NC are refractive indexes for the g-line, the F-line, the d-line, and the C-line of the Fraunhofer line, the Abbe number vd and partial dispersion ratio θgF are expressed as follows:

$$vd=(Nd-1)/(NF-NC) \tag{a}$$

$$\theta gF=(Ng-NF)/(NF-NC) \tag{b}$$

N55 is a refractive index for a wavelength of 550 nm. The first grating base part 6 has a thickness of 40 μm, the second grating base part 7 has a thickness of 2 μm, a diffraction pitch P is 100 to 3000 μm and a grating height d1 is 10.96 to 11.00 μm.

Next follows a description of a relationship between a phase difference and a diffraction efficiency of the diffraction optical element 1 according to this example. In the diffraction optical element 1 according to this example, the diffracted light of the diffraction order m has the highest diffraction efficiency for a wavelength λ when an optical path length difference Φ(λ) satisfies the following conditional expression (c).

$$\Phi(\lambda)=-(n02-n01)\times d1=m\lambda \tag{c}$$

In the conditional expression (c), n01 is a refractive index of the material of the first diffraction grating 8 for the light with the wavelength λ, n02 is a refractive index of the material of the second diffraction grating 9 for the light with the wavelength λ, and d1 is a grating thickness of each of the first diffraction grating 8 and the second diffraction grating 9.

Assume that a negative diffraction order of light diffracts downwardly from the 0-th order diffracted light in FIG. 2, and a positive diffraction order of light diffracts upwardly from the 0-th order diffracted light. Then, in the diffraction grating having such a grating shape that the grating thickness of the first diffraction grating 8 on the incident side increases from the bottom to the top as illustrated in FIG. 2, the sign of the grating thickness d1 is positive in the condition (c). The diffraction efficiency η(λ) for an arbitrary wavelength λ, can be expressed by the following expression (d).

$$\eta(\lambda)=\text{sinc}^2[\pi\{m-\Phi(\lambda)/\lambda\}] \tag{d}$$

In the expression (d), m is the order of the diffracted light to be evaluated, and Φ(λ) is an optical path length difference in one unit grating in the diffraction optical element 1 for the light with the wavelength λ. In addition, sinc(x) is a function represented by {sin(x)/x}. The designed wavelength of the diffraction optical element 1 according to this example is 550 nm. The diffraction optical element 1 according to this example has the highest diffraction efficiency with a grating height d1 of 10.96 μm for the viewing wavelength region.

This example makes the first diffraction grating 8 and the second diffraction grating 9 of different materials. The second diffraction grating 9 is made of a low refractive index and high dispersion material, and the first diffraction grating 8 is made of a high refractive index and low dispersion material having a refractive index higher than that of the second diffraction grating 9. Satisfying the following conditional expressions (1), (2), and (3) provides a high diffraction efficiency.

$$35<vd1 \tag{1}$$

$$vd2<25 \tag{2}$$

$$0.960 \leq (n1d-n2d)\times d/(m\times \lambda d) \leq 1.040 \tag{3}$$

In the conditional expressions (1) to (3), n1d and n2d are refractive indexes of the materials of the first diffraction grating 8 and the second diffraction grating 9 for the d-line, vd1 and vd2 are Abbe numbers, d is the grating height, and m is the designed order.

Next follows a description of the dielectric thin film 10 provided on the wall surface part in the diffraction grating according to this example. The dielectric thin film 10 has a substantially uniform thickness along the grating wall surface, and is disposed on at least part of the boundary surface between the first diffraction grating 8 and the second diffraction grating 9. In this example, the dielectric thin film 10 is tightly bonded between the wall surface part of the first diffraction grating 8 and the wall surface part of the second diffraction grating 9. The dielectric film 10 confines the light beam incident near the grating wall surface and serves as an optical waveguide.

In order to provide the optical waveguide effect to the diffraction optical element 1, the refractive index (average refractive index) nha within the effective diameter of the dielectric thin film 10 and refractive indexes n1 and n2 of the first diffraction grating 8 and the second diffraction grating 9 may satisfy the following conditional expression (4) for light with the design wavelength λd (nm). The effective diameter is a maximum diameter from the optical axis O in a region through which the light beam passes.

$$n2<n1<nha \tag{4}$$

In addition to the conditional expression (4), a relative refractive index difference Δ may satisfy the following conditional expression (5). This configuration improves the diffraction efficiency of the designed order of the light beam incident at a designed incident angle, reduces the diffraction efficiency of the designed order ±1st order, unnecessary light reaching an imaging plane caused by the light incident at an oblique incident angle, a wavelength characteristic, and a polarization characteristic.

$$0.005 < \Delta < 0.090 \tag{5}$$

The relative refractive index difference Δ can be found from the following expression (5a).

$$\Delta = \frac{n_{ha}^2 - n_1^2}{2n_{ha}^2} \tag{5a}$$

Satisfying the lower limit in the conditional expression (5) can reduce the unnecessary light reaching the imaging plane caused by the light beam incident at an oblique incident angle. Satisfying the upper limit in the conditional expression (5) can reduce the polarization dependency.

The conditional expression (5) may satisfy the following conditional expression (5b).

$$0.010 < \Delta < 0.080 \tag{5b}$$

Since the dielectric thin film 10, the first diffraction grating 8, and the second diffraction grating 9 constitute an asymmetric three-layer flat waveguide, it is known that the waveguide mode satisfies the following eigenvalue equations expressed by the expressions (6) and (7). The expression (6) relates to TE polarized light, and the expression (7) relates to TM polarized light.

$$\tan(\kappa_{TE} W) = \frac{\kappa_{TE}(\gamma_{TE} + \delta_{TE})}{(\kappa_{TE}^2 - \gamma_{TE}\delta_{TE})} \tag{6}$$

$$\kappa_{TE} = \sqrt{k_0^2 n_h^2 - \beta_{TE}^2}$$

$$\gamma_{TE} = \sqrt{\beta_{TE}^2 - k_0^2 n_1^2}$$

$$\delta_{TE} = \sqrt{\beta_{TE}^2 - k_0^2 n_2^2}$$

$$\tan(\kappa_{TM} W) = \frac{n_h^2 \kappa_{TM}(n_2^2 \gamma_{TM} + n_1^2 \delta_{TM})}{(n_2^2 n_1^2 \kappa_{TM}^2 - n_h^4 \gamma_{TM} \delta_{TM})}$$

$$\kappa_{TM} = \sqrt{k_0^2 n_h^2 - \beta_{TM}^2} \tag{7}$$

$$\gamma_{TM} = \sqrt{\beta_{TM}^2 - k_0^2 n_1^2}$$

$$\delta_{TM} = \sqrt{\beta_{TM}^2 - k_0^2 n_2^2}$$

In the expressions (6) and (7), $k_0$ is expressed by the following expression (8).

$$k_0 = 2\pi/\lambda \tag{8}$$

A cutoff width in a single mode of the asymmetric three-layer flat waveguide for the TE polarized light is expressed by the expression (8a), and that for the TM polarized light is expressed by the expression (8b).

$$W_{C,TE} = \frac{1}{\kappa_C} \tan^{-1}\left(\frac{\delta_C}{\kappa_C}\right) \tag{8a}$$

$$W_{C,TM} = \frac{1}{\kappa_C} \tan^{-1}\left(\frac{n_h^2 \delta_C}{n_2^2 \kappa_C}\right) \tag{8b}$$

In the expressions (8a) and (8b), κc and δc are expressed by the following expressions (9).

$$\kappa_C = k_0 \sqrt{n_h^2 - n_1^2}$$

$$\delta_C = k_0 \sqrt{n_1^2 - n_2^2} \tag{9}$$

In this example, a width dm of the dielectric thin film 10 on the wall surface part and an average Wc of the cutoff width in the single mode of the TE polarization and the TM polarization in the expression (11) may satisfy the following conditional expression (10). This configuration improves the diffraction efficiency of the designed order of the light beam incident with the design incident angle, and reduces the diffraction efficiency of the designed order ±1st order. In addition, this configuration can reduce the unnecessary light reaching the imaging plane in the light beam incident at the oblique incident angle, the wavelength characteristic, and the polarization characteristic.

$$0.500 \leq dm/Wc \leq 2.000 \tag{10}$$

In the expression (10), the average Wc of the cutoff width is expressed by the following expression (11).

$$W_C = \frac{W_{C,TE} + W_{C,TM}}{2} \tag{11}$$

The conditional expression (10) may be replaced with the following conditional expression (10a).

$$0.750 \leq dm/Wc \leq 1.750 \tag{10a}$$

In the diffraction optical element according to the present invention, the phase difference between the refractive index of the waveguide that includes the dielectric thin film 10 on the wall surface part and the high refractive index material of the first diffraction grating 8 is appropriately controlled. The unnecessary light that would occur without the dielectric thin film 10 can be confined in the optical waveguide, and the waveguide mode and the phase of the diffraction grating can be matched.

This configuration can consequently improve the diffraction efficiency of the designed order and reduce the unnecessary light caused by the light beam incident at an oblique incident angle (out-of-image light incidence angle) which reaches the imaging plane. A phase difference Pma of the wall surface part may satisfy the following conditional expression (12) for at least one m-th annular band. The m-th annular band is a grating number of the diffraction grating and is a grating number (m=1, 2, . . . ) assigned in departing order from the optical axis center in a direction perpendicular to the optical axis center.

$$0.013 < Pma < 0.035 \tag{12}$$

In the expression (12), Pma=(nhm−n1)×dm/λd. Herein, nhm is a refractive index of the dielectric thin film 10 on the grating wall surface in the m-th annular band, dm is a thickness (nm) of the dielectric thin film 10 on the grating wall surface in the m-th annular band, and λd is the designed wavelength (nm). The designed wavelength λd has a value near the average value of the use wavelength of the diffraction optical element 1, and more specifically falls within the wavelength range that satisfies the following conditional expression (13), where λave (nm) is an average value of the use wavelength.

$$0.900 < \lambda d/\lambda ave < 1.100 \quad (13)$$

The diffraction optical element according to this example is used in the visible region, and the use wavelength is 400 nm to 700 nm and the average value λave for the used wavelength is 550 nm. If the conditional value exceeds the upper or lower limit in the conditional expression (12), it is out of the optimal condition of the waveguide mode, and reduces the light confining effect or, for example, the effect of reducing the unnecessary light reaching the imaging plane caused by the light beam incident with the oblique incident angle.

The conditional expression (12) may be replaced with the following conditional expression (12a).

$$0.015 < Pma < 0.030 \quad (12a)$$

The conditional expression (12) may be replaced with the following conditional expression (12b).

$$0.017 < Pma < 0.026 \quad (12b)$$

Figure 3:
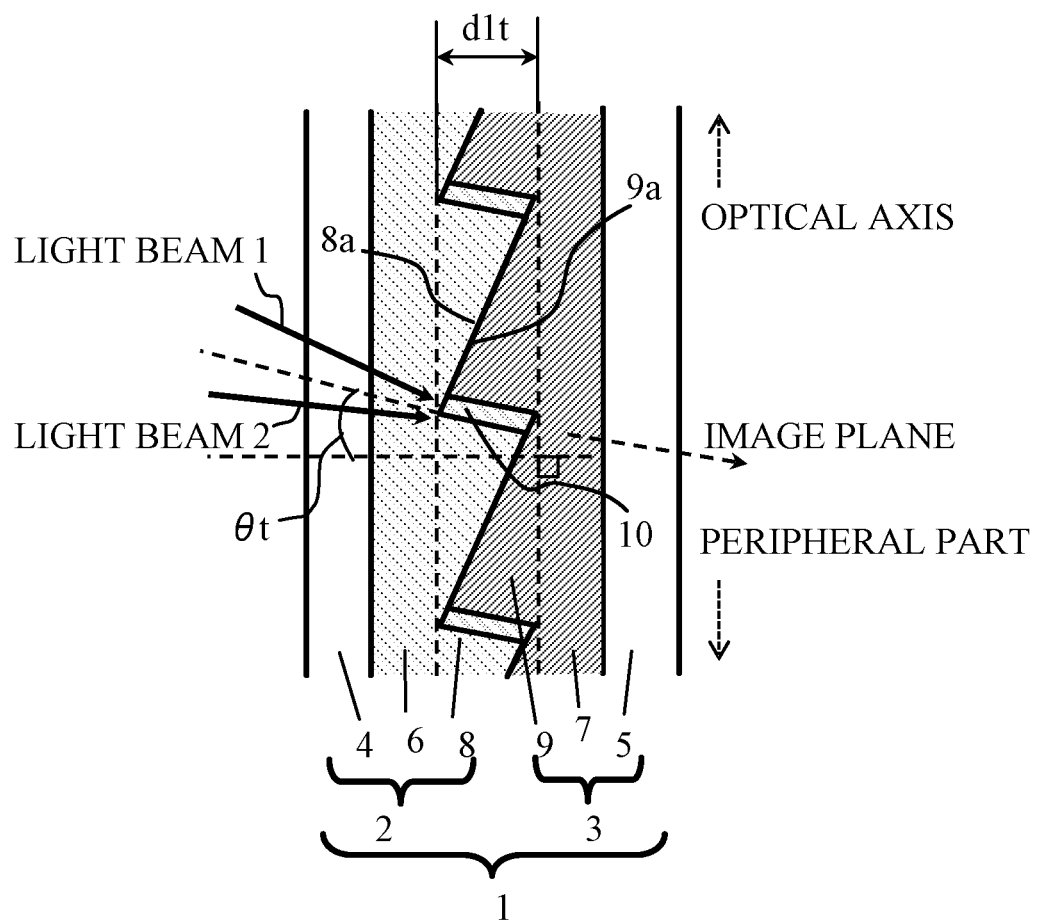
FIG. 3 is a sectional view of a diffraction grating according to Example 1 which oblique incident light enters.

Next follows a behavior of the unnecessary light caused by the light beam incident at the oblique incident angle (out-of-screen light incidence angle) on the diffraction optical element 1 according to this example by using the RCWA (Rigorous Coupled Wave Analysis) in the strict wave calculation. FIG. 3 is a sectional view of the diffraction grating calculated by the RCWA. The sectional view illustrated in FIG. 3 corresponds to a partial sectional view of the underside of the diffraction optical element 1 illustrated in FIG. 1B.

An angle θt is 15° between a surface normal of an envelope surface made by connecting grating tips on the diffraction optical element 1 and the grating wall surface and approximately coincides with a center of gravity angle of an effective light beam incident on the diffraction optical element 1. In the diffraction optical element 1, an angle of the exit light beam reaching the image plane corresponds to a direction of the exit angle of the light beam incident at the angle θt=15° or in a direction about 15.5° relative to the surface normal of the envelope surface made by connecting the grating tips on the diffraction optical element 1.

The diffraction optical element 1 has a diffraction pitch of 100 μm and a grating height d1t of 10.65 μm, is optimized so that the first order diffracted light has a maximum intensity, and possesses a positive refractive power. The grating materials of the first diffraction grating 8 and the second diffraction grating 9 are the same as those described with reference to FIG. 2. The dielectric thin film 10 on the grating wall surface has a refractive index of 1.7460 for a wavelength of 550 nm and a thickness of 99 nm.

The RCWA calculation is performed for the grating wall surface of the diffraction optical element 1 illustrated in FIG. 3 with two light beams incident with oblique incidence angles (out-of-image light incident angle) (light beams 1 and 2 in FIG. 3). The light beam 1 incident from the upper side in FIG. 3 is incident at 25° relative to the surface normal of the envelope surface made by connecting the grating tips of the diffraction optical element 1. The light beam 2 incident from the underside in FIG. 3 is incident at 5° relative to the surface normal of the envelope surface made by connecting the grating tips of the diffraction optical element 1. The wavelength of each light beam is 550 nm.

Figure 4A:
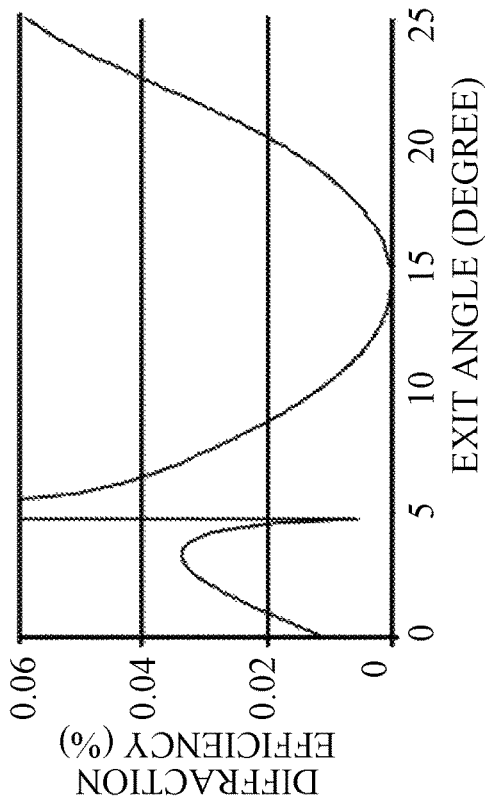
FIGS. 4A and 4B illustrate a diffraction efficiency when an obliquely incident light beam enters the diffraction grating according to Example 1.
Figure 4B:
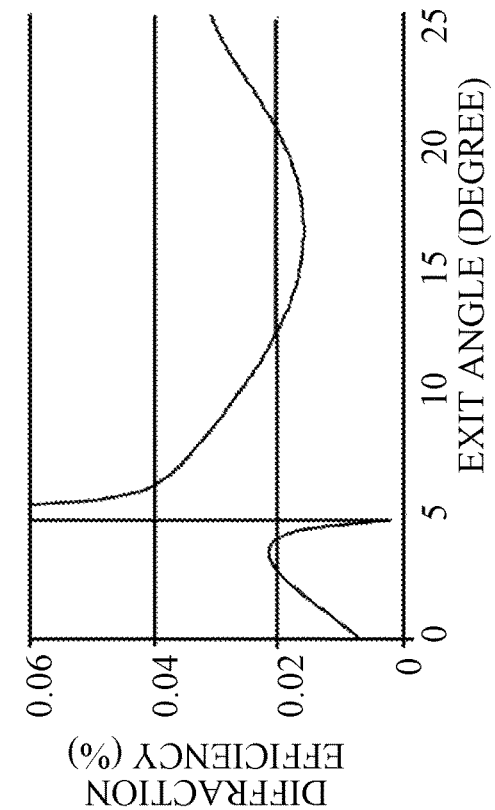
Figure 5A:
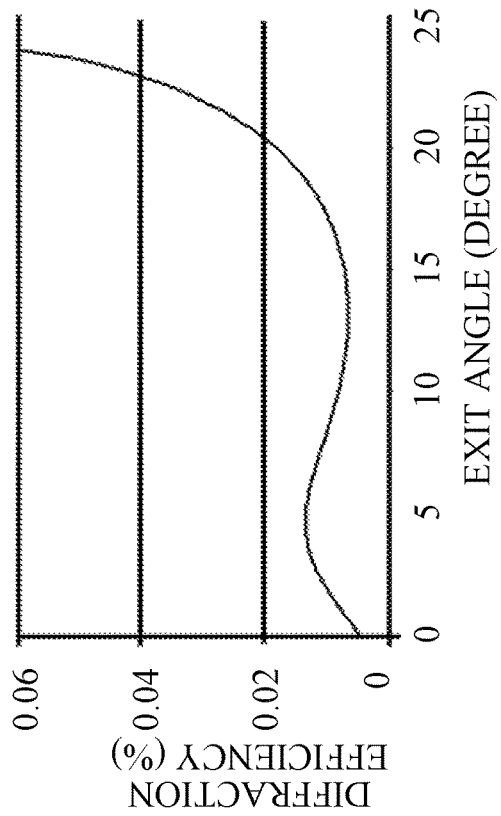
FIGS. 5A and 5B illustrate is a diffraction efficiency when an obliquely incident light beam enters the diffraction grating according to a comparative example.
Figure 5B:
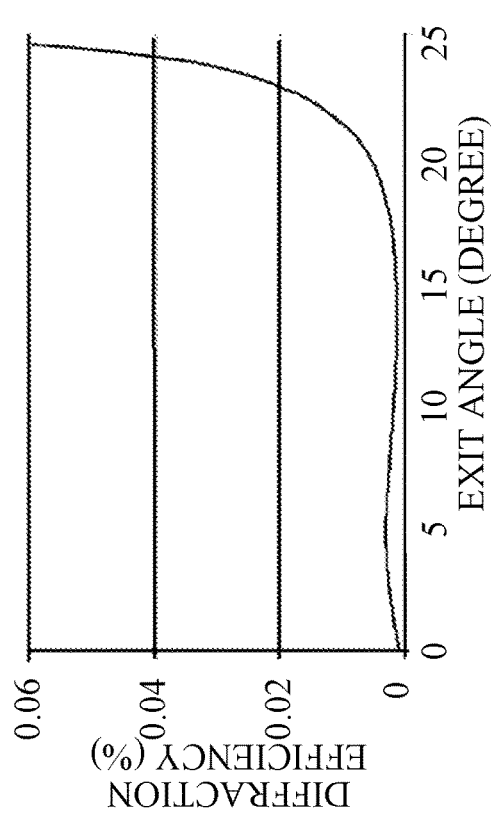

FIG. 4A illustrates the diffraction efficiency for an exit angle of the light beam 1 (25°). FIG. 4B illustrates the diffraction efficiency for an exit angle of the light beam 2 (5°). The RCWA diffraction efficiency is similarly calculated for the diffraction optical element according to the comparative example configured similar to FIG. 3 and having no dielectric thin film 10 (or a configuration having a small phase difference between the dielectric thin film 10 on the grating wall surface and the first diffraction grating 8). FIG. 5A illustrates the diffraction efficiency for the exit angle in the light beam 1 (25°) from the diffraction optical element according to the comparative example. FIG. 5B illustrates the diffraction efficiency for the exit angle in the light beam 2 (5°) from the diffraction optical element according to the comparative example.

As understood from FIGS. 4A, 4B, 5A, and 5B, the desired dielectric thin film 10 provided to the grating wall surface part for the light beam 1 slightly increases a light quantity of the unnecessary diffracted light. Since a light quantity of the unnecessary diffracted light for the light beam 2 significantly reduces, the unnecessary diffracted light can be reduced as a whole. The phase difference between the dielectric film 10 on the grating wall surface and the first diffraction grating 8 is changed according to the position in the radial direction of the diffraction optical element 1 for the diffraction optical element 1 according to this example. In other words, this example is configured so as to reduce the phase difference between the dielectric film 10 on the grating wall surface and the first diffraction grating 8 around the diffraction optical element 1.

Next follows an effect of reducing the phase difference between the dielectric thin film 10 on the grating wall surface and the first diffraction grating 8 around the diffraction optical element 1. For the diffraction optical element 1 illustrated in FIG. 3, incident light is likely to be shielded by a barrel (holder) that holds the diffraction optical element 1 and a lens disposed on the incident side of the diffraction optical element 1 as a position moves to the peripheral part of the diffraction optical element 1. In other words, the light incident from a side opposite to the optical axis with respect to the grating wall part, like the incident light beam 2, is likely to be shielded as the position moves to the peripheral part. On the other hand, the light incident from the optical axis with respect to the grating wall part, like the incident light beam 1, is less likely to be shielded. Hence, a ratio of the light incident from the optical axis side increases at the peripheral part of the diffraction optical element 1, like the light beam 1.

Accordingly, a light quantity of unnecessary light illustrated in FIG. 4A is shifted to that illustrated in FIG. 5A and an unnecessary diffracted light quantity can be reduced by reducing the phase difference between the dielectric thin film 10 on the grating wall surface and the first diffraction grating 8 in the peripheral part of the diffraction optical element 1. More specifically, the following conditional expression (14) may be satisfied.

$$-0.500 < Pe/Pmax < 0.700 \quad (14)$$

In the conditional expression (14), Pm is a phase difference between the dielectric thin film 10 on the grating wall surface and the first diffraction grating 8 in each of the m-th annular band (m=1, 2, . . . ), Pmax is a maximum phase difference (a maximum value of the phase difference Pm of all annular bands), and Pe is a phase difference between the dielectric thin film 10 and the first diffraction grating 8 at the effective diameter (beam maximum effective diameter part).

When the conditional value exceeds the upper limit in the conditional expression (14), the phase difference increases between the dielectric thin film 10 on the grating wall surface and the first diffraction grating 8 at the peripheral part of the diffraction optical element 1, and a light quantity of the unnecessary diffracted light increases. When the conditional value exceeds the lower limit in the conditional expression (14), the refractive index on the grating wall surface becomes too small, the waveguide mode in the dielectric thin film 10 destroys and a light quantity of the unnecessary diffracted light increases.

The conditional expression (14) may be replaced with the following conditional expression (14a).

$$-0.400 < Pe/Pmax < 0.600 \quad (14a)$$

The conditional expression (14) may be replaced with the following conditional expression (14b).

$$-0.200 < Pe/Pmax < 0.400 \quad (14b)$$

The phase difference Pe at the effective diameter satisfying the following conditional expression (15) can reduce the phase difference at the peripheral part and the unnecessary diffracted light quantity.

$$-0.015 < Pe < 0.018 \quad (15)$$

The conditional expression (15) may be replaced with the following conditional expression (15a).

$$-0.005 < Pe < 0.012 \quad (15a)$$

The diffraction optical element 1 according to this example may satisfy the following conditional expression (16) where Pedg is an average value of the phase differences Pm on the wall surface in the annular band ranging from 80% to 100% of the effective diameter.

$$-0.005 < Pedg < 0.021 \quad (16)$$

Satisfying the conditional expression (16) can optimize the effect of reducing the unnecessary diffracted light quantity not only in the outermost peripheral part but also in a wide peripheral part.

The conditional expression (16) may be replaced with the following conditional expression (16a).

$$0.000 < Pedg < 0.019 \quad (16a)$$

For the diffraction optical element 1 according to this example, as described above, it is easy to shield the incident light from the side away from the optical axis at the peripheral part, but the shielding effect of the incident light reduces at the center part. As described in FIGS. 4A, 4B, 5A, and 5B, the center part can reduce wholly the unnecessary diffracted light by securing the phase difference between the dielectric thin film 10 on the grating wall surface and the first diffraction grating 8 and by maintaining the waveguide mode. More specifically, the following conditional expression (17) is satisfied where Pcnt is an average value of the phase differences Pm on the wall surface in the annular band ranging from 20% to 60% of the effective diameter.

$$0.013 < Pcnt < 0.035 \quad (17)$$

The conditional expression (17) may be replaced with the following conditional expression (17a).

$$0.017 < Pcnt < 0.026 \quad (17a)$$

Satisfying the conditional expression (17) can reduce an unnecessary diffracted light quantity in a wide center area. The conditional expression (17) may be satisfied in a range of 0% (optical axis) to 20% of the effective diameter. Since the diffraction grating near the optical axis has a wide grating pitch, the unnecessary diffracted light has a small intensity. The influence of the unnecessary diffraction light is small even when the conditional expression (17) is not satisfied. It is difficult to control the dielectric thin film 10 near the optical axis, but the diffraction optical element 1 can be easily manufactured by relaxing a control range of the phase difference Pm.

Appropriately setting the material and the film width of the dielectric thin film 10 which satisfy the above relationship can provide the effect of this example, and the material of the dielectric thin film 10 is not particularly limited. A method of manufacturing the dielectric thin film 10 is not particularly limited. For example, the second diffraction grating 9 may be manufactured, and then the dielectric thin film 10 may be selectively formed. More specifically, after the dielectric thin film 10 is formed into a thin film shape by a physical vapor deposition method such as a vacuum evaporation, a spin coating method, or the like, patterned by a lithography method, a nanoimprinting method, or the like, and selectively formed by an etching method or the like. A selectively forming method may use a vapor deposition method etc. and a mask pattern etc. In addition, the width, the refractive index, or the shape of the thin film can be controlled for each annular band of the diffraction optical element 1. Any one of these manufacturing methods can simultaneously form the wall surface part and the slope part by making the dielectric thin films 10 of the grating wall surface part and the grating slope part of the same raw material, simplifying the manufacturing method.

The diffraction optical element 1 according to this example has a reduced phase difference between the dielectric thin film 10 on the grating wall surface and the first diffraction grating 8 in the peripheral part. A method for reducing the phase difference may contain a method of reducing the thickness of the dielectric thin film 10 and a method of reducing the refractive index of the dielectric thin film 10, but it is difficult to control the phase difference to a desired value by simultaneously controlling the thickness and the refractive index. Therefore, in reducing the phase difference of the peripheral part of the diffraction optical element 1, it is necessary to select one of methods of mainly controlling the thickness of the dielectric thin film 10, or of mainly controlling the refractive index of the dielectric thin film 10. Thereby, the diffraction optical element 1 can be easily manufactured.

Figure 6A:
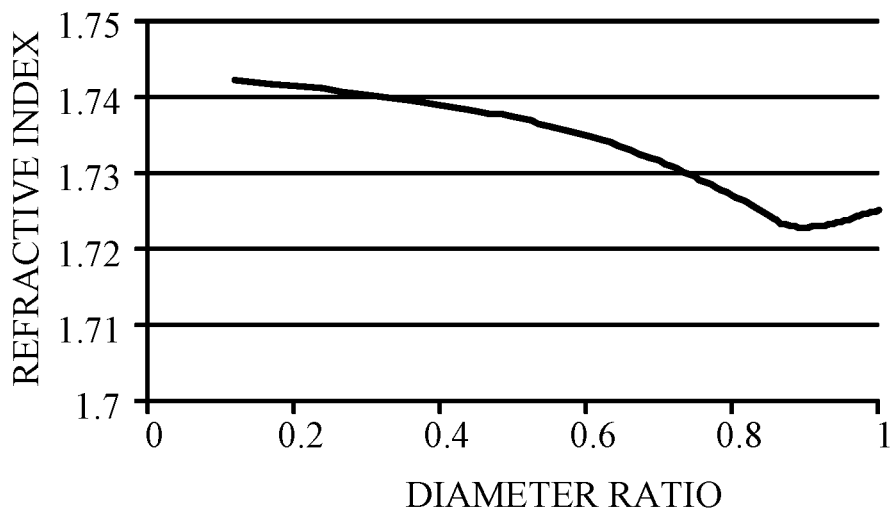
FIGS. 6A to 6C illustrate a characteristic of a wall surface dielectric film in the diffraction grating according to Example 1.
Figure 6B:
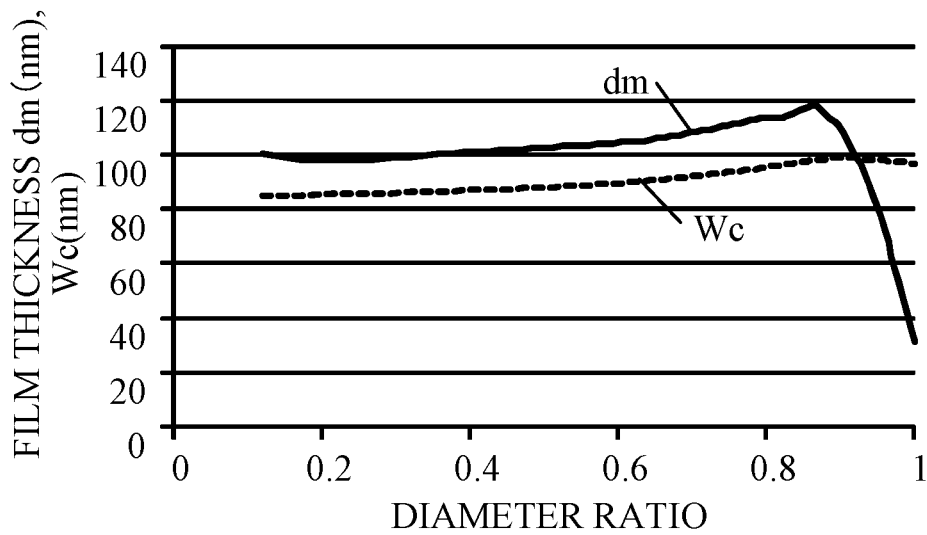
Figure 6C:
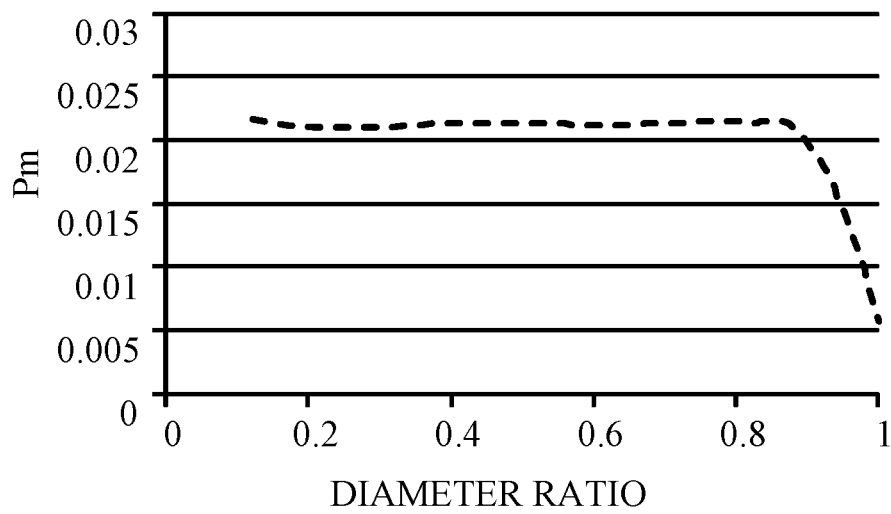

FIG. 6A illustrates the refractive index of the dielectric thin film 10 on the wall surface part at the position in the radial direction of the diffraction optical element 1 according to this example. FIG. 6B illustrates the thickness of the dielectric thin film 10 on the wall surface part. FIG. 6C illustrates the phase difference Pm of the dielectric thin film 10 on the wall surface part. In FIGS. 6A, 6B and 6C, the abscissa axis represents a ratio in the radial direction, 0 represents the optical axis, and 1 represents a beam effective diameter. In FIG. 6B, the thickness dm is indicated by a solid line, and the cutoff width We calculated from the expression (11) is indicated by a broken line.

In the diffraction optical element 1 according to this example, the phase difference Pm of the dielectric thin film 10 is reduced on the wall surface part by gradually reducing the thickness dm of the dielectric thin film 10 on the wall surface part from a position nearly 90% of the maximum beam diameter to the position with the maximum effective diameter. Thereby, the unnecessary diffracted light in the peripheral part can be reduced. Since a desired phase difference is secured in a range from the nearly optical axis to nearly 90% of the beam maximum diameter, the unnecessary diffracted light can be satisfactorily reduced when the oblique incident light beam is incident.

Where the phase difference of the dielectric thin film 10 on the wall surface part is controlled by controlling the thickness, the following conditional expression (18) may be satisfied where dmax is a maximum value of the thickness of the dielectric thin film 10 on the grating wall surface, and de is a maximum value of the thickness of the dielectric thin film on the grating wall surface at the beam maximum effective diameter part.

$$0.000 < de/dmax < 0.700 \tag{18}$$

The conditional expression (18) may be replaced with the following conditional expression (18a).

$$0.000 < de/dmax < 0.500 \tag{18a}$$

Example 2

Next follows a description of a diffraction optical element according to Example 2 of the present invention. While the diffraction optical element according to Example 1 includes, in order from the light incident side, the grating made of the high refractive index and low dispersion material and the grating made of the low refractive index and high dispersion material, the present invention is not limited to this configuration.

Figures 7A, 7B:
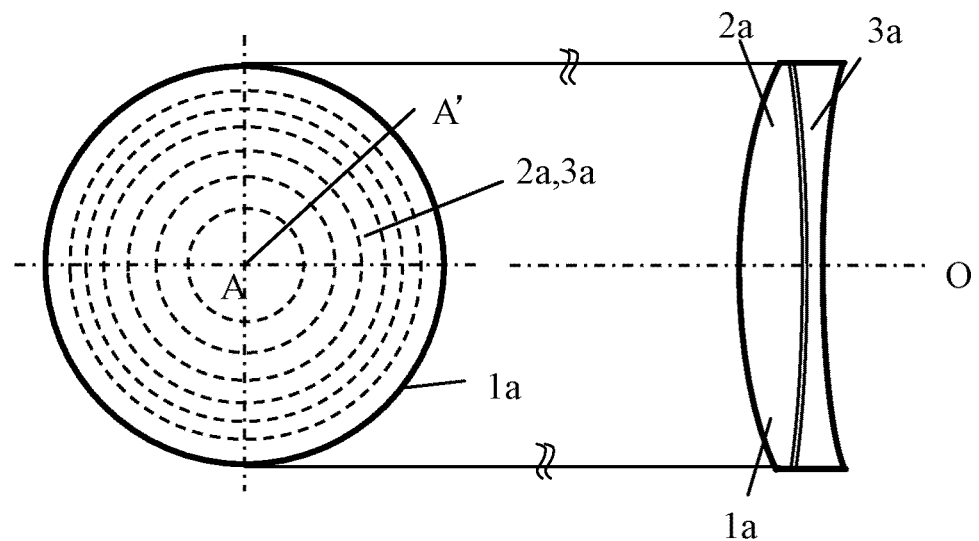
FIGS. 7A and 7B are front and side views of a diffraction optical element according to Example 2.
Figure 8:
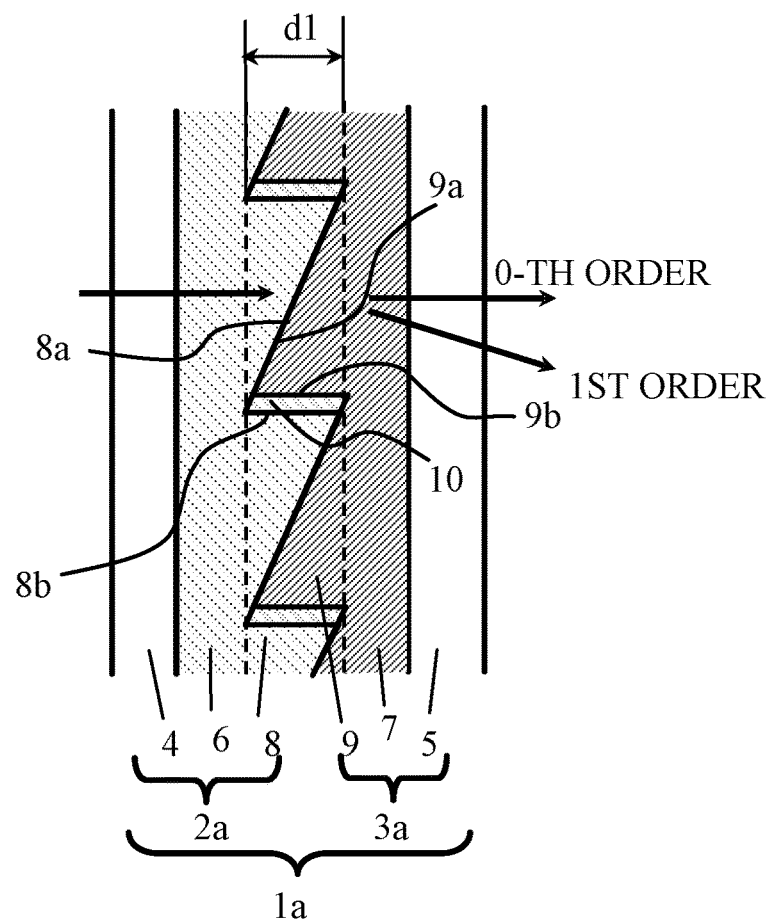
FIG. 8 is a partially sectional view of the diffraction optical element according to Example 2.

FIG. 7A is a front view of a diffraction optical element 1a according to this example, and FIG. 7B is a side view of the diffraction optical element 1a. FIG. 8 is an enlarged view of part of the sectional shape when the diffraction optical element 1a illustrated in FIG. 7A is taken along a line A-A'. FIG. 8 is a deformed shape in the grating depth direction. Similar to the diffraction optical element 1 according to Example 1, the diffraction optical element 1a of this example includes a first element part 2a (first diffraction grating 8) and a second element part 3b (second diffraction grating 9) adhered to and laminated on each other via the dielectric thin film 10. In the diffraction optical element 1a illustrated in FIG. 8, a second material of the second diffraction grating 9 on the light exit side uses a resin made by mixing $ZrO_2$ fine particles in acrylic resin and having Nd=1.619, N55=1.6216, νd=44.3, and θgF=0.569. A first material of the first diffraction grating 8 uses a resin made of mixing ITO fine particles in acrylic resin and having Nd=1.565, N55=1.5718, νd=19.2, and θgF=0.425.

The first grating base part 6 made of the first material has a thickness of 40 μm, the second grating base part 7 made of the second material has a thickness of 2 μm, a diffraction pitch P is 100 to 3000 μm, and a grating height d1 is 10.96 to 11.00 μm. The dielectric thin film 10 on the grating wall surface part uses a thin film made of a mixture material of $Al_2O_3$ and $ZrO_2$, and the thickness on the grating wall surface varies according to the position in the radial direction of the diffraction optical element 1a. The refractive index slightly changes according to the position of the diffraction optical element 1a. Similar to the diffraction optical element 1 according to Example 1, the diffraction optical element 1a according to this example also has a smaller phase difference Pm of the dielectric thin film 10 and lowers an unnecessary diffracted light amount by reducing the thickness of the dielectric thin film 10 in the peripheral part of the diffraction optical element.

Figure 9A:
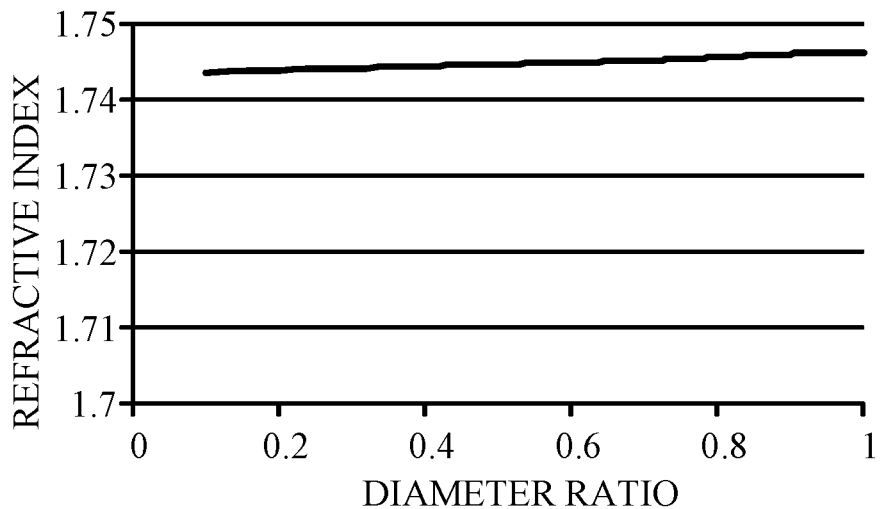
FIGS. 9A to 9C illustrate a characteristic of a wall surface dielectric film in the diffraction grating according to Example 2.
Figure 9B:
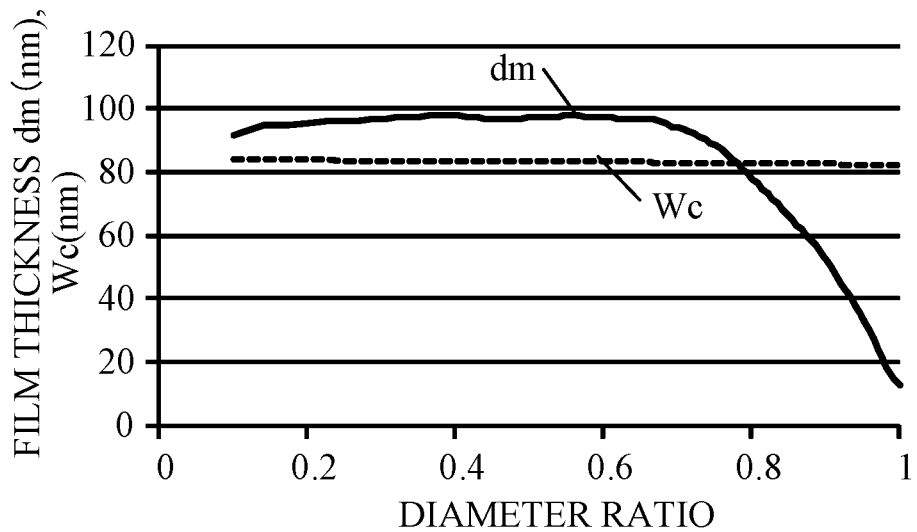
Figure 9C:
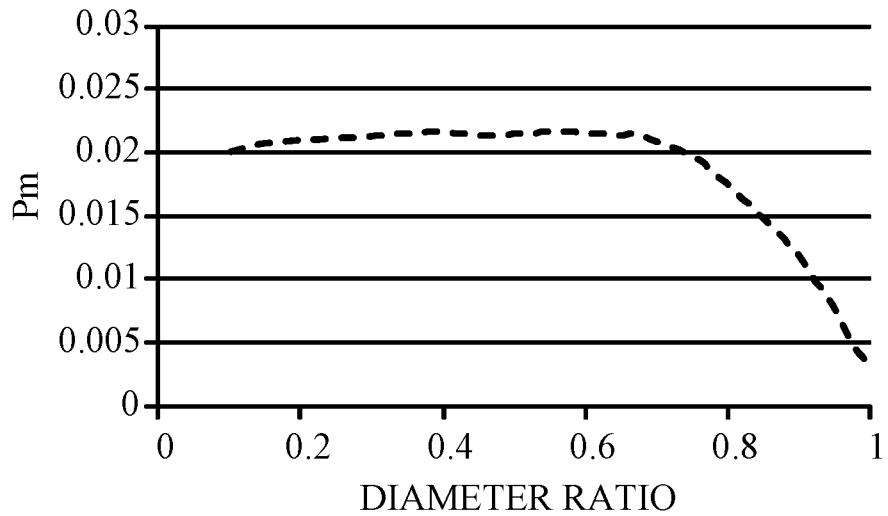

FIG. 9A illustrates the refractive index of the dielectric thin film 10 at the position in the radial direction of the diffraction optical element 1a according to this example. FIG. 9B illustrates the thickness of the dielectric thin film 10. FIG. 9C illustrates the phase difference Pm of the dielectric thin film 10. In FIGS. 9A, 9B and 9C, the abscissa axis represents a ratio in the radial direction, 0 represents the optical axis, and 1 represents a beam effective diameter. In FIG. 9B, the thickness dm is indicated by a solid line, and the cutoff width We calculated from the equation (11) is indicated by a broken line.

In the diffraction optical element 1a according to this example, the phase difference Pm of the dielectric thin film 10 is reduced at the peripheral part by gradually reducing the thickness dm of the dielectric thin film 10 on the wall surface part from a position nearly 70% of the beam maximum diameter to the position with the maximum effective diameter. Thereby, the unnecessary diffracted light amount in the peripheral part can be reduced. Since a desired phase difference is secured in a range from the nearly optical axis to nearly 70% of the beam maximum diameter, the unnecessary diffracted light can be satisfactorily reduced when the obliquely incident light beam is incident.

Example 3

Next follows a description of a diffraction optical element according to Example 3 of the present invention. In the diffraction optical element 1a, the phase difference Pm is reduced between the dielectric thin film 10 at the wall surface part and the first diffraction grating 8 by reducing the thickness at the peripheral part. However, the present invention is not limited to this example.

In the diffraction optical element according to this example, the first diffraction grating 8 and the second diffraction grating 9 are the same as those of Example 2, and the configuration of the dielectric thin film 10 on the wall surface part is different.

Figure 10A:
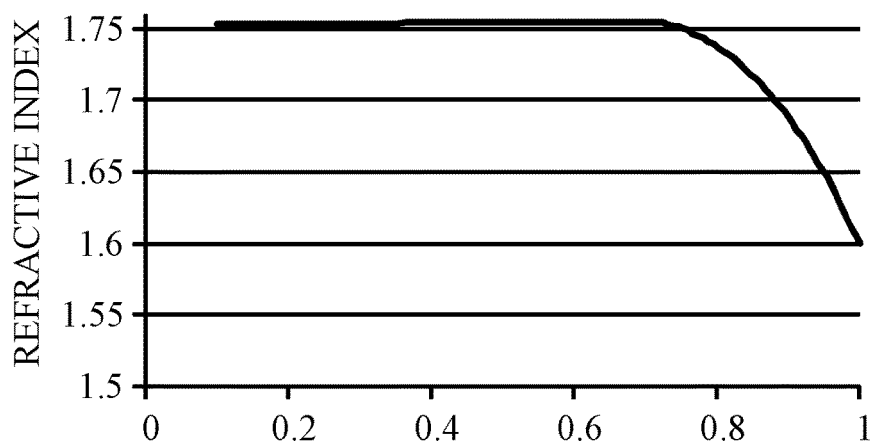
FIGS. 10A to 10C illustrate a characteristic of a wall surface dielectric film in the diffraction grating according to Example 3.
Figure 10B:
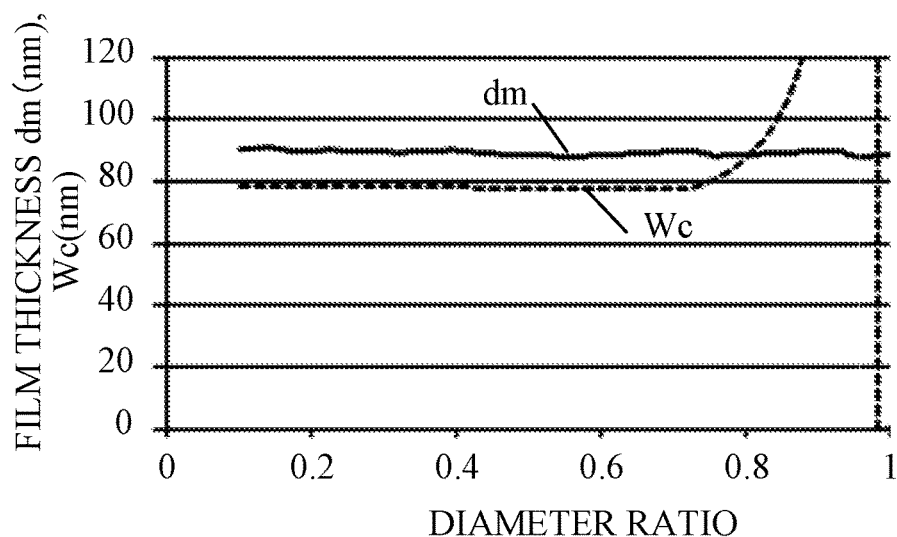
Figure 10C:
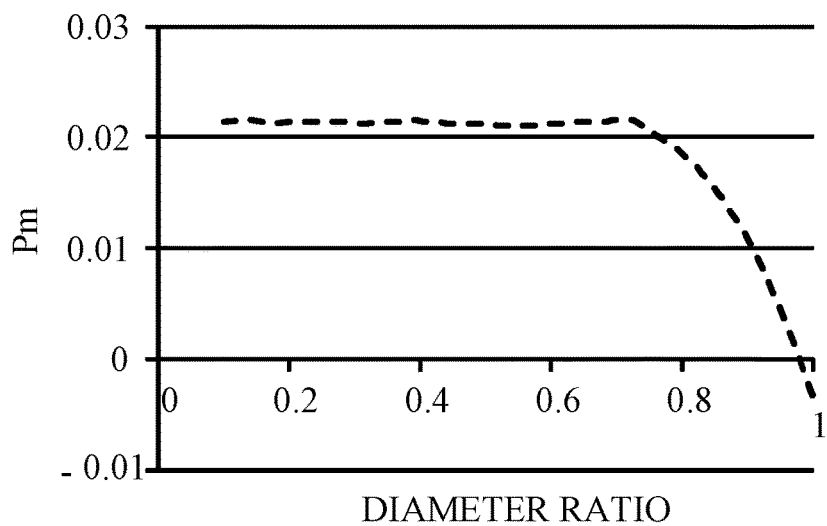

FIG. 10A illustrates the refractive index of the dielectric thin film 10 on the wall surface part at the position in the radial direction of the diffraction optical element according to this example. FIG. 10B illustrates the thickness of the dielectric thin film 10. FIG. 10C illustrates the phase difference Pm of the dielectric thin film 10. In FIGS. 10A, 10B, and 10C, the abscissa axis represents a ratio in the radial direction, 0 represents the optical axis, and 1 represents the beam effective diameter. In FIG. 10B, the thickness dm is indicated by a solid line, and the cutoff width We calculated from the equation (11) is indicated by a broken line. As illustrated in FIGS. 10A to 10C, the diffraction optical element according to this example reduces a refractive index of the dielectric thin film 10 at the peripheral part of the diffraction optical element, a phase difference Pm, and the unnecessary diffracted light amount when an obliquely incident light beam is incident.

In controlling the phase difference of the dielectric thin film 10 at the wall surface part by controlling the refractive index as in this example, the following conditional expression (19) may be satisfied.

$$-0.500 < \Delta Ne/\Delta Nmax < 0.700 \tag{19}$$

In the conditional expression (19), ΔNmax is a maximum value of a difference between the refractive index of the dielectric thin film 10 on the grating wall surface and the refractive index of the first diffraction grating 8, ΔNe is a maximum value of a difference between the refractive index of the dielectric thin film 10 and the refractive index of the first diffraction grating 8 at an effective diameter. The expression (19) may be replaced with the following conditional expression (19a).

$$-0.200 < \Delta Ne/\Delta Nmax < 0.500 \tag{19a}$$

Table 1 shows values corresponding to the respective conditional expressions of the diffraction optical elements according to Examples 1 to 3.

TABLE 1

| Numerical Example | Conditional Expression | | |
|---|---|---|---|
| | 1 | 2 | 3 |
| N1d | 1.619 | 1.619 | 1.619 |
| N2d | 1.565 | 1.565 | 1.565 |
| vd1 | 44.3 | 44.3 | 44.3 |
| vd2 | 19.2 | 19.2 | 19.2 |
| n1 | 1.623 | 1.623 | 1.623 |
| n2 | 1.572 | 1.572 | 1.572 |
| nha | 1.730 | 1.745 | 1.727 |
| Δ | 0.060 | 0.068 | 0.058 |
| Pe/Pmax | 0.264 | 0.135 | −0.171 |
| Pe | 0.0057 | 0.0029 | −0.0037 |
| Pmax | 0.0217 | 0.0217 | 0.0216 |
| Pedg | 0.0171 | 0.0108 | 0.0091 |
| Pcnt | 0.0212 | 0.0214 | 0.0212 |
| de/dmax | 0.262 | 0.133 | — |
| ΔNe/ΔNmax | — | — | −0.174 |

Example 4

Next follows a description of a diffraction optical element according to Example 4 of the present invention. In the diffraction optical elements according to Examples 1 to 3, the dielectric thin film 10 is formed only on the grating wall surface part, but the present invention is not limited to these examples.

Figure 11:
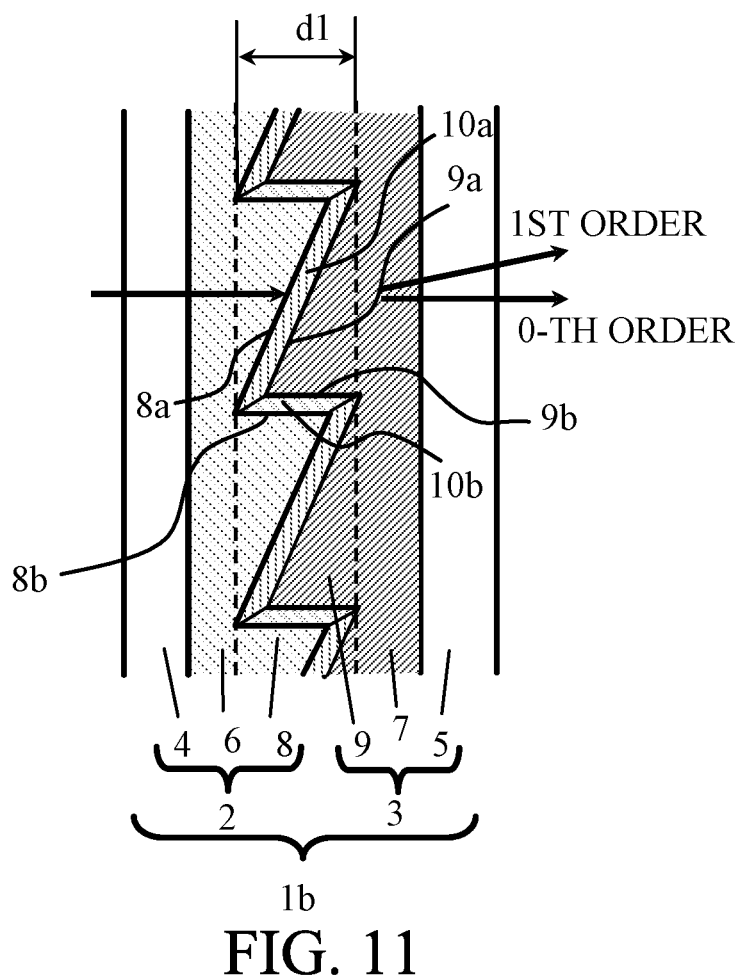
FIG. 11 is a partially sectional view of a diffraction optical element according to Example 4.

FIG. 11 is a sectional view of a diffraction optical element 1b according to this example. In the diffraction optical element 1b according to this example, a grating slope 8a of the first diffraction grating 8 and a grating slope 9a of the second diffraction grating 9 are laminated on each other via a dielectric thin film 10a. In addition, a grating wall surface 8b of the first diffraction grating 8 and a grating wall surface 9b of the second diffraction grating 9 are laminated on each other via the dielectric thin film 10b.

Even when the grating slope 8a and the grating slope 9a do not closely contact each other as in this example, satisfying the conditional expressions (1) to (19) can restrain the unnecessary diffracted light from reaching the image plane when the obliquely incident light beam enters the diffraction optical element 1b. The dielectric thin film 10a on the grating slope part and the dielectric thin film 10b on the grating wall surface part may be made of the same material or different materials.

Example 5

Figure 12:
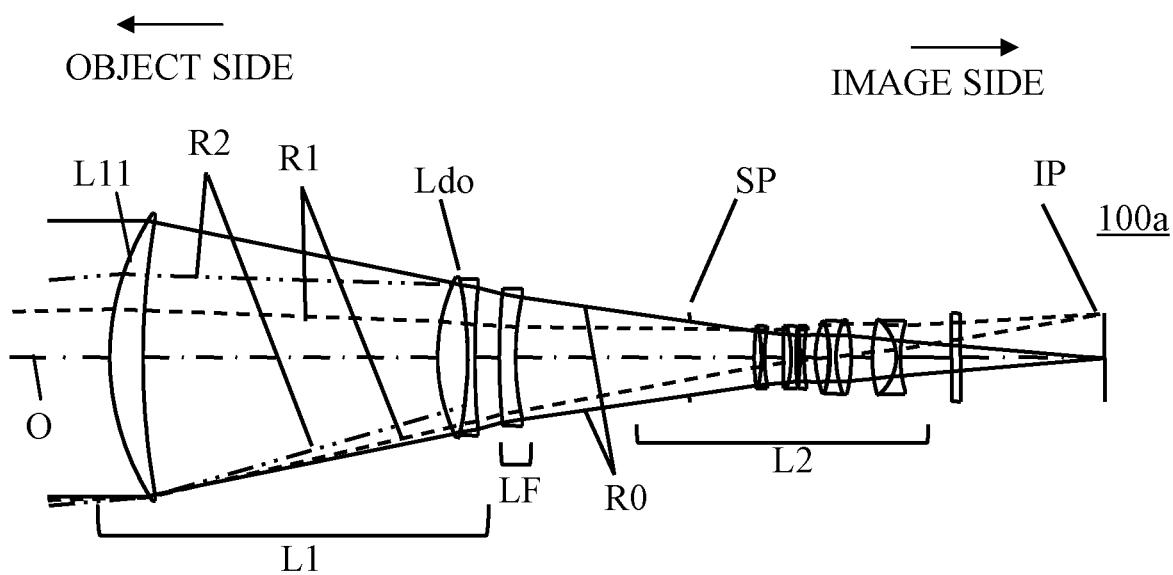
FIG. 12 is an optical path diagram in an optical system according to Example 5.

Referring now to FIG. 12, a description will be given of an optical system according to Example 5 of the present invention. FIG. 12 is an optical path diagram of an optical system 100a having a diffraction optical element Ldo (corresponding to the diffraction optical element according to Examples 1 to 4).

The optical system 100a according to this example has a focal length f=780 mm, an F-number (Fno)=5.8, and a maximum image height Y=21.6 mm. The optical system 100a includes, in order from an object side to an image side, a first lens unit L1 having a positive refractive power, a focus unit LF, an aperture stop (diaphragm) SP, and a second lens unit L2 having a negative refractive power. IP is an image plane. During focusing, the optical system 100a can focus on a short distance object by moving the focus unit LF to the image side. The first lens unit L1 includes a lens L11 and a diffraction optical element Ldo.

In FIG. 12, R0 denotes an on-axis light beam, R1 denotes an off-axis light beam that provides a maximum image height, and R2 denotes an out-of-image light beam incident on the diffraction optical element Ldo (light beam incident at an incidence angle equal to or higher than the maximum image height light beam). In the optical system 100a, the diffraction optical element Ldo is distant from the lens L11 on the object side. Thus, as the image height shifts upwardly in FIG. 12 and the incident angle of the light beam increases, a light beam range incident on the underside of the diffraction optical element Ldo becomes narrower in FIG. 12. Thus, like the light beam 2 described with reference to FIG. 3, a light beam incident from the side opposite to the optical axis O with respect to the grating wall surface is shielded by the lens L11 closer to the object side than the diffraction optical element Ldo and does not enter the peripheral part of the diffraction optical element Ldo. In other words, in the optical system 100a, the maximum effective diameter in the diffraction optical element Ldo of the maximum image height light beam is smaller than the maximum effective diameter in the diffraction optical element Ldo of the on-axis light beam. Thus, the unnecessary light reducing effect can be obtained by reducing the phase difference on the peripheral part of the diffraction optical element, as in the conditional expression (14).

This example may satisfy the following conditional expression (20) where Ld (mm) is a distance from a surface closest to the object to a diffraction surface and E0 (mm) is a beam effective diameter on the surface closest to the object.

$$0.300 < E0/Ld < 2.000 \quad (20)$$

When the conditional value exceeds the upper limit in the conditional expression (20), the unnecessary light reducing effect reduces because the incident light beam shielding effect is reduced by the lens L11 closer to the object than that the diffraction optical element Ldo. When the conditional value exceeds the lower limit in the conditional expression (20), the aberration correcting effect by the diffraction optical element Ldo is reduced and influences of a variety of aberrations of the optical system 100a increase.

The diffraction optical element Ldo according to this example is disposed closer to the object than the aperture stop SP. Disposing the diffraction optical element Ldo on the image side of the aperture stop SP, the out-of-image light beam is less likely to enter the diffraction optical element Ldo. Thus, even if the phase difference at the wall surface part in the peripheral part of the diffraction optical element Ldo is made smaller, it is difficult to obtain the sufficient effect of reducing the unnecessary light. Even when the unnecessary light reducing effect is obtained, the effective angle of view is limited.

Example 6

Figure 13:
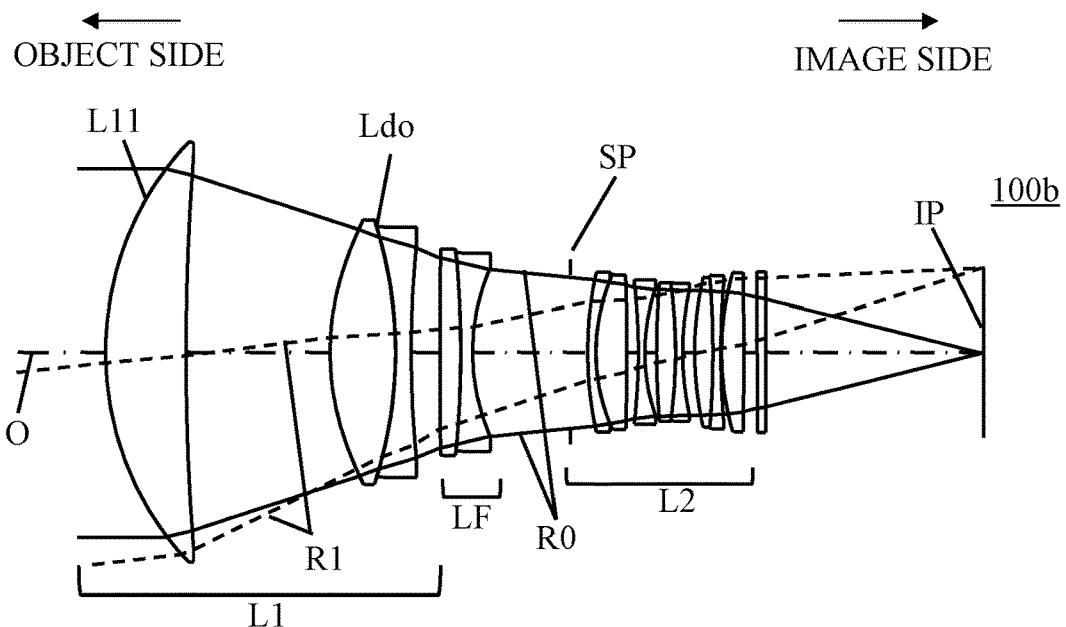
FIG. 13 is an optical path diagram in an optical system according to Example 6.

Referring now to FIG. 13, a description will be given of an optical system according to Example 6 of the present invention. FIG. 12 is an optical path diagram of an optical system 100b having the diffraction optical element Ldo (corresponding to the diffraction optical element according to each example).

The optical system 100b according to this example has a focal length f=196 mm, Fno=2.05, and a maximum image height Y=21.6 mm. The optical system 100b includes, in order from an object side to an image side, a first lens unit L1 having a positive refractive power, a focus unit LF, an aperture stop SP, and a second lens unit L2 having a positive refractive power. IP is an image plane. The optical system 100b can focus on a short distance object by moving the focus unit LF to the image side in focusing. The first lens unit L1 includes a lens L11 and the diffraction optical element Ldo (corresponding to diffraction optical elements of Examples 1 to 4).

In FIG. 13, R0 represents an on-axis light beam, and R1 represents an off-axis light beam that provides a maximum image height. In the optical system 100b, the diffraction optical element Ldo is distant from the lens L11 on the object side. Thus, as the image height shifts upwardly in FIG. 13 and the incident angle of the light beam increases, a light beam range incident on the underside of the diffraction optical element Ldo becomes narrower in FIG. 13. Thus, like the light beam 2 described with reference to FIG. 3, a light beam incident from the side opposite to the optical axis O with respect to the grating wall surface is shielded by the lens L11 closer to the object than the diffraction optical element Ldo and does not enter the peripheral part of the diffraction optical element Ldo. The unnecessary light reducing effect can be obtained by reducing the phase difference on the peripheral part of the diffraction optical element.

Table 2 shows values corresponding to the respective conditional expressions in the optical systems 100a and 100b according to Examples 5 and 6.

TABLE 2

| Numerical Example | Conditional Expression | |
| --- | --- | --- |
| | 5 | 6 |
| EO | 134 | 103 |
| Ld | 175 | 75 |
| EO/Ld | 0.77 | 1.38 |

In Examples 5 and 6, one diffraction optical element Ldo is disposed in the optical systems 100a and 100b, but the present invention is not limited to these examples, and a plurality of diffraction optical elements Ldo may be disposed in the optical systems 100a and 100b.

Example 7

Figure 14:
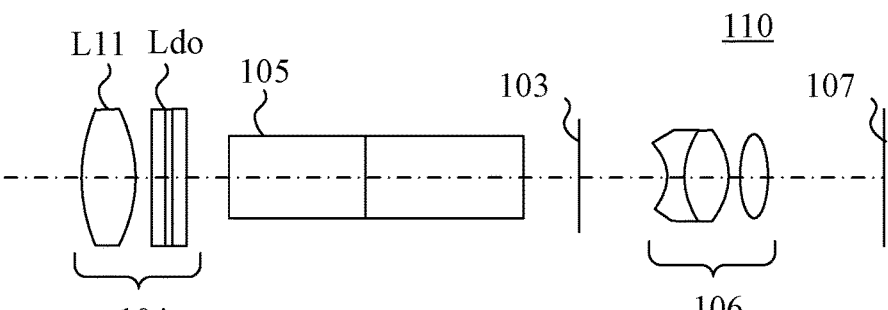
FIG. 14 is a configuration diagram of an observation optical system according to Example 7.

Referring now to FIG. 14, a description will now be given of an observation optical system in binoculars according to Example 7 of the present invention. FIG. 14 is a configuration diagram of the observation optical system 110.

In FIG. 14, reference numeral 103 denotes an imaging plane, reference numeral 104 denotes an objective lens, reference numeral 105 denotes a prism for erecting an inverted image, reference numeral 106 denotes an eyepiece (ocular lens), and reference numeral 107 denotes a pupil plane. The objective lens 104 includes the lens L11 and the diffraction optical element Ldo (corresponding to diffraction optical elements according to Examples 1 to 4). The diffraction optical element Ldo is provided so as to correct the chromatic aberration and the like on the imaging plane 103 of the objective lens 104. Since the diffraction efficiency characteristic of the observation optical system 110 is greatly improved as compared with the prior art as described in Examples 1 to 4, the observation optical system 110 suffers from little flare light, has a high resolving power at a low frequency, and possesses a high optical performance. This example provides the diffraction optical element Ldo on a flat glass surface, but the present invention is not limited to this example and the diffraction optical element Ldo may be provided on a concave or convex surface of the lens. A plurality of diffraction optical elements Ldo may be disposed in the observation optical system 110.

This example provides, but is not limited to, the diffraction optical element Ldo in the objective lens 104, and may provide the diffraction optical element Ldo to the surface of the prism 105 and in the eyepiece 106 for the effects similar to the above effects. Providing the diffraction optical element Ldo on the object side of the imaging plane 103 has an effect of reducing the chromatic aberration in the objective lens 104. Therefore, in the naked eye observation system, the diffraction optical element Ldo may be provided to at least the objective lens 104. While this example discusses the binocular observation optical system 110, the diffraction optical element Ldo is applicable to an observation optical system such as a ground telescope and an astronomical observing telescope. The diffraction optical element Ldo is also applicable to an optical finder such as a lens shutter camera and a video camera. Even in these cases, the same effect as described above can be obtained.

Example 8

Figure 15:
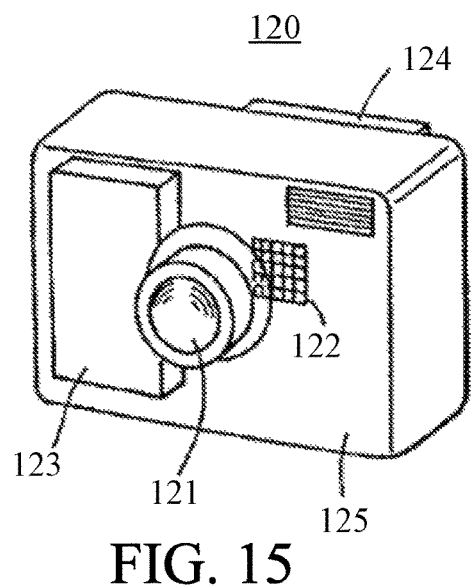
FIG. 15 is a schematic diagram of an imaging apparatus according to Example 8.

Referring now to FIG. 15, a description will be given of an imaging apparatus according to Example 8 of the present invention. FIG. 15 is a schematic diagram of the imaging apparatus 120. The imaging apparatus 120 is a digital still camera using an optical system having the diffraction optical elements according to Examples 1 to 4 for an imaging optical system.

In FIG. 15, reference numeral 125 denotes a camera body, and reference numeral 121 denotes an imaging optical system. Reference numeral 122 denotes an image sensor (photoelectric conversion element), such as a CCD sensor or a CMOS sensor, provided in a camera main body 125 and receives an object image (optical image) formed by the imaging optical system 121. Reference numeral 123 denotes a memory configured to record information corresponding to an object image photoelectrically converted by the image sensor 122. Reference numeral 124 denotes a finder, such as a liquid crystal display panel, used to observe an object image formed on the image sensor 122. Thus, using the imaging optical system including the diffraction optical element according to each example can realize an imaging apparatus having a high optical performance with few optical flares and ghosts.

Each example can provide a diffraction optical element which has a simple configuration and a high diffraction efficiency in the entire range of the visible region, and the unnecessary light reducing effect optimized for each location when receiving an obliquely incident light beam different from a designed incident light beam. Using the diffraction optical element for the optical system can satisfactorily reduce a variety of aberrations, such as a chromatic aberration and flares. Therefore, each example can provide a diffraction optical element, an optical system, and an imaging apparatus in which the optical performance is improved by appropriately setting the film characteristics according to the position in the radial direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198312, filed on Oct. 12, 2017, which is hereby incorporated by reference herein in its entirety.

What is claimed is:

1. A diffraction optical element comprising:
a first diffraction grating having a first grating surface and a first grating wall surface;
a second diffraction grating having a second grating surface and a second grating wall surface; and
a plurality of thin films configured to contact the first grating wall surface and the second grating wall surface,
wherein the following conditional expressions are satisfied:

$n2<n1<nha,$ $-0.500<Pe/Pmax<0.700,$ and $0.013<Pma<0.035$ where n1 and n2 are refractive indexes for a designed wavelength of the first diffraction grating and the second diffraction grating, nha is a refractive index for the designed wavelength of each of the plurality of thin films in an effective diameter, Pmax is a maximum value of a phase difference for the designed wavelength between the first diffraction grating and the plurality of thin films in the effective diameter, Pe is a phase difference for the designed wavelength between the first diffraction grating and an outermost thin film among the plurality of thin films in the effective diameter, and Pma is a phase difference for the designed wavelength between the first diffraction grating and a thin film other than the outermost thin film among the plurality of thin films in the effective diameter.

2. The diffraction optical element according to claim 1, wherein the following conditional expression is satisfied:

$0.013<Pcnt<0.035$ where Pcnt is an average value of a phase difference for the designed wavelength between the thin film and the first diffraction grating in an annular zone ranging from 20% to 60% of the effective diameter.

3. The diffraction optical element according to claim 1, wherein the following conditional expression is satisfied:

$-0.015<Pe<0.018.$

4. The diffraction optical element according to claim 1, wherein the following conditional expression is satisfied:

$-0.005<Pedg<0.021$ where Pedg is an average value of a phase difference for the designed wavelength between the thin film and the first diffraction grating in an annular zone ranging from 80% to 100% of the effective diameter.

5. The diffraction optical element according to claim 1, wherein the following conditional expression is satisfied:

$0.000<de/dmax<0.700$ where dmax is a maximum thickness of the thin film, and de is a thickness of the thin film with the effective diameter.

6. The diffraction optical element according to claim 1, wherein the following conditional expression is satisfied:

$-0.500<\Delta Ne/\Delta Nmax<0.700$ where $\Delta Nmax$ is a maximum difference between the refractive index of the thin film and the refractive index of the first diffraction grating, and $\Delta Ne$ is a difference between the refractive index of the thin film with the effective diameter and the refractive index of the first diffraction grating.

7. An optical system comprising:
a diffraction optical element according to claim 1; and
a holder configured to hold the diffraction optical element.

8. The optical system according to claim 7, wherein the following conditional expression is satisfied:

$0.300<E0/Ld<2.000$ where Ld is a distance from an optical surface closest to an object in the optical system to a diffraction surface of the diffractive optical element, and E0 is an effective diameter of the optical surface.

9. The optical system according to claim 7, wherein a maximum effective diameter of the diffraction optical element with respect to a maximum image height light beam is smaller than a maximum effective diameter of the diffraction optical element with respect to an on-axis light beam.

10. The optical system according to claim 7, further comprising a diaphragm disposed on an image side of the diffraction optical element.

11. An imaging apparatus comprising:
an optical system that includes a diffraction optical element according to claim 1; and
an image sensor configured to receive an image formed by the optical system.

12. The imaging apparatus according to claim 11, wherein he following conditional expression is satisfied:

$0.300<E0/Ld<2.000$ where Ld is a distance from an optical surface closest to an object in the optical system to a diffraction surface of the diffractive optical element, and E0 is an effective diameter of the optical surface.

13. A diffraction optical element comprising:
a first diffraction grating having a first grating surface and a first grating wall surface;
a second diffraction grating having a second grating surface and a second grating wall surface; and
a plurality of thin films configured to contact the first grating wall surface and the second grating wall surface,
wherein the following conditional expressions are satisfied:

$n2<n1<nha,$ $-0.500<Pe/Pmax<0.700,$ and $-0.500<\Delta Ne/\Delta Nmax<0.700$ where n1 and n2 are refractive indexes for a designed wavelength of the first diffraction grating and the second diffraction grating, nha is a refractive index for the designed wavelength of each of the plurality of thin films in an effective diameter, Pmax is a maximum value of a phase difference for the designed wavelength between the first diffraction grating and the plurality of thin films in the effective diameter, Pe is a phase difference for the designed wavelength between the first diffraction grating and an outermost thin film among the plurality of thin films in the effective diameter, $\Delta Nmax$ is a maximum difference between the refractive indexes of the plurality of thin films and the refractive index of the first diffraction grating, and $\Delta Ne$ is a difference between the refractive index of the first diffraction grating and the refractive index of the outermost thin film.

* * * * *